US007367057B2

(12) United States Patent
Das et al.

(10) Patent No.: US 7,367,057 B2
(45) Date of Patent: Apr. 29, 2008

(54) PROCESSOR BASED SYSTEM AND METHOD FOR VIRUS DETECTION

(75) Inventors: Kaustubh Das, Philadelphia, PA (US); Hani Elgebaly, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 624 days.

(21) Appl. No.: 10/612,763

(22) Filed: Jun. 30, 2003

(65) Prior Publication Data

US 2005/0005153 A1 Jan. 6, 2005

(51) Int. Cl.
*G06F 17/30* (2006.01)
*G06F 11/00* (2006.01)
*G06F 15/00* (2006.01)

(52) U.S. Cl. .............................. 726/24; 726/22; 726/30; 712/208

(58) Field of Classification Search .................. 726/24, 726/22, 30; 127/208
See application file for complete search history.

(56) References Cited

OTHER PUBLICATIONS

Putting a Business Suit on Grid Technology, New plan issues standard IDs for viruses Paulson, L.D.; Computer vol. 38, Issue 7, Jul. 2005 pp. 24-25.*
Uploadable safelets for support of the ground-to-air communication Pakstas, A.; Shagaev, I.; Communications, 2000. ICC 2000. 2000 IEEE International Conference on vol. 1, Jun. 18-22, 2000 pp. 581-585 vol. 1.*
Protect your users against the latest web-based threat: malicious code on caching servers [Your Internet Connection] Rabinovitch, E.; Communications Magazine, IEEE vol. 45, Issue 3, Mar. 2007 pp. 20-22.*
Lee, Karig, McGregor, Shi, Enlisting Hardware Architecture to Thwart Malicious Code Injection, Proceedings of the International Conference on Security in Pervasive Computing (SPC-2003), LNCS 2802, pp. 237-252, Springer Verlag, Mar. 2003.*
Frantzen, Shuey, StackGhost: Hardware Facilitated Stack Protection, Proceedings of the 10th USENIX Security Sympsium, Aug. 2001.*
http://en.wikipedia.org/wiki/NX_bit, 2006.*

* cited by examiner

*Primary Examiner*—David Y Jung
(74) *Attorney, Agent, or Firm*—Schwegman, Lundberg & Woessner, P.A.

(57) ABSTRACT

A processor based system and method for virus detection is described. In one embodiment, a processor comprises a plurality of functional units. The plurality of functional units includes a first functional unit and a second functional unit, the first functional unit to receive instructions, to determine whether ones of the instructions are associated with a virus, and to transmit the ones of the instructions not associated with the virus to the second functional unit.

In one embodiment, the method includes receiving an instruction in a first functional unit of a processor pipeline. The method further includes determining whether the instruction is associated with a virus. The method further includes transmitting the instruction to a second functional unit of the processor pipeline for further processing.

25 Claims, 13 Drawing Sheets

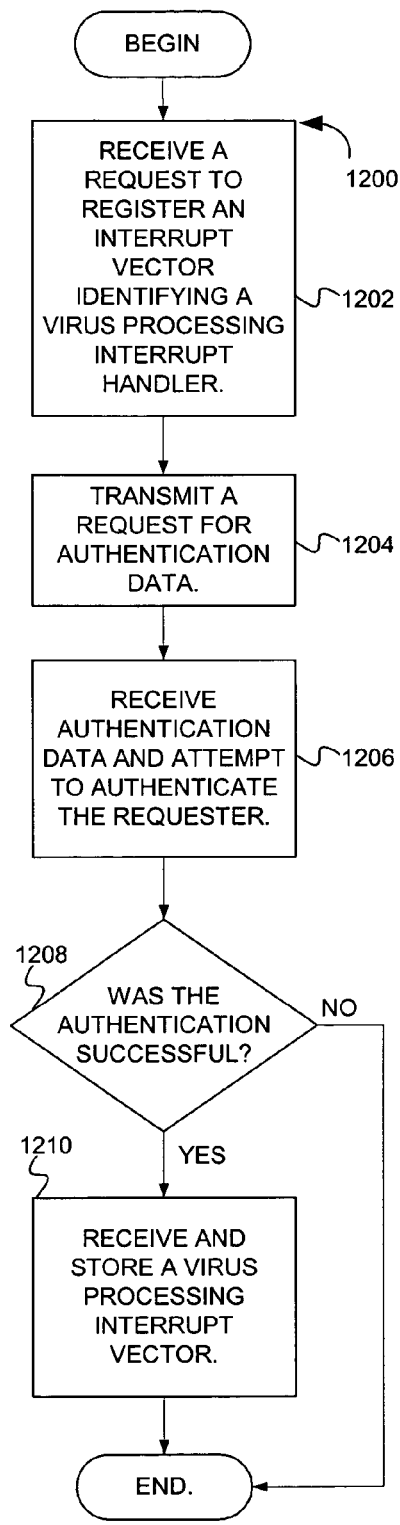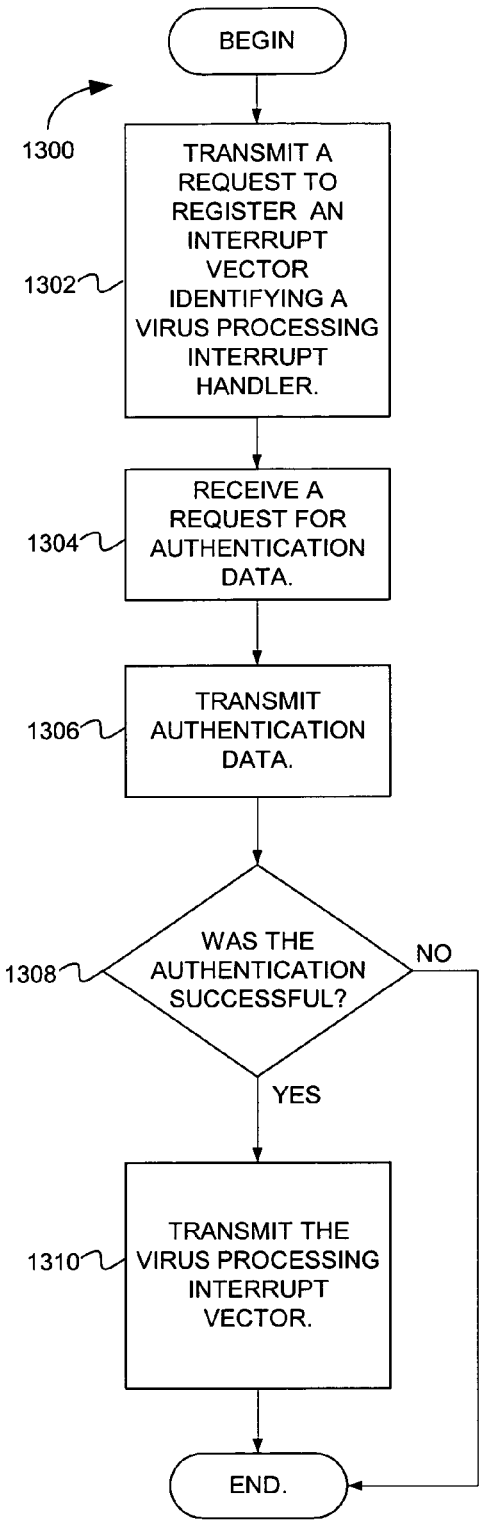
FIG. 12
FIG. 13

PROCESSOR BASED SYSTEM AND METHOD FOR VIRUS DETECTION

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD

This invention relates generally to computer viruses and more particularly to the computer virus detection systems.

BACKGROUND

In general, computer viruses (hereinafter referred to as viruses) are programs designed to replicate themselves by attaching virus programs to non-virus software. For example, a virus might attach a copy of itself to a spreadsheet program, word processing document, Internet browser, computer game, etc. After a program has been "infected" with a virus, each time the infected program runs the virus also runs, further replicating the virus. Because the presence of computer viruses often goes undetected, viruses can cause unexpected and harmful results. For example, viruses have been known to delete files, alter system settings, and consume system resources.

Traditionally, there have been two main virus types including executable and boot sector viruses. Executable viruses attach themselves to executable programs, so the virus programs run while the executable programs are running. One characteristic of executable viruses is that they will not execute until the "host" program is executed. Boot sector viruses attach themselves to floppy or hard disk boot sectors. Boot sectors store operating system programs for loading parts of an operating system into a computer's memory during boot-up. When viruses are stored in the boot sector, they are guaranteed to execute because boot sector programs are always executed during operating system boot-up. Once the boot sector virus is loaded into memory, it typically can infect the boot sector of any floppy disk inserted into the computer.

Virus detection software has been developed to detect and eliminate these and other computer virus types. Virus detection programs typically scan computer files for specific bit patterns associated with known viruses. These bit patterns are often referred to as virus signatures. Scanning files for virus signatures can be a slow and resource draining process. Various techniques have been developed to limit the scope of signature searches. One such technique is scalpel scanning, which limits signature searching to the parts of file that are likely to contain virus entry points.

However, virus writers have thwarted many signature-scanning techniques by creating randomly encrypted and polymorphic viruses. Randomly encrypted viruses are difficult to detect because each new copy of the virus is randomly encrypted, so new virus copies may not exhibit traceable signatures until they are decrypted. Randomly encrypted viruses remain encrypted until just before execution, when they perform self-decryption, which may reveal known signatures. Polymorphic viruses are also difficult to detect because they change their encryption logic with each new infection. That is, the virus produces different encrypting and decrypting code for each new virus that is inserted into non-virus software. Because the encryption/decryption code is constantly changing, copies of the virus may not include traceable signatures, even when the virus is not encrypted.

In response to random encryption and polymorphic viruses, some virus detection systems emulate executable programs in secure portions of memory. Because encrypted viruses decrypt themselves before executing, emulating potentially infected programs can produce viruses in a decrypted state. Matching decrypted viruses with known virus signatures is typically more effective than doing the same with encrypted viruses. During emulation, the emulator periodically scans the secure memory portion for known virus signatures. If the emulator finds known virus signatures, the corresponding non-virus programs are processed and viruses are removed.

One disadvantage of using emulators to search for virus signatures is that emulators consume a relatively large amount of system resources. Another disadvantage is that emulators can miss known viruses when the viruses execute before being processed by the emulator. Yet another disadvantage is that some viruses are "aware" of emulators and thus do not decrypt during emulation. Another disadvantage is that emulators often do not support an entire processor instruction set. Thus, an emulator may not detect viruses that include instructions which the emulator does not support.

Another disadvantage of emulator based virus detection systems is that emulators typically do not know how long to emulate programs before associated viruses will decrypt themselves. Because emulation times are unknown, the only way to ensure that emulation times are not too short for decrypting viruses is to emulate programs forever, which is typically impossible.

BRIEF DESCRIPTION OF THE FIGURES

The invention may best be understood by referring to the following description and accompanying drawings that are used to illustrate embodiments of the invention. In the drawings:

FIG. 12 is a flow diagram illustrating operations for receiving a interrupt vector identifying a virus processing interrupt handler, according to exemplary embodiments of the invention.

FIG. 13 is a flow diagram illustrating operations for transmitting a interrupt vector identifying a virus processing interrupt handler, according to exemplary embodiments of the invention.

DESCRIPTION OF THE EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description.

Herein, block diagrams illustrate exemplary embodiments of the invention. Also herein, flow diagrams illustrate operations of the exemplary embodiments of the invention. The operations of the flow diagrams will be described with reference to the exemplary embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams.

Hardware and Operating Environment

This section provides an overview of the exemplary hardware and the operating environment in which embodiments of the invention can be practiced.

Figure 1:
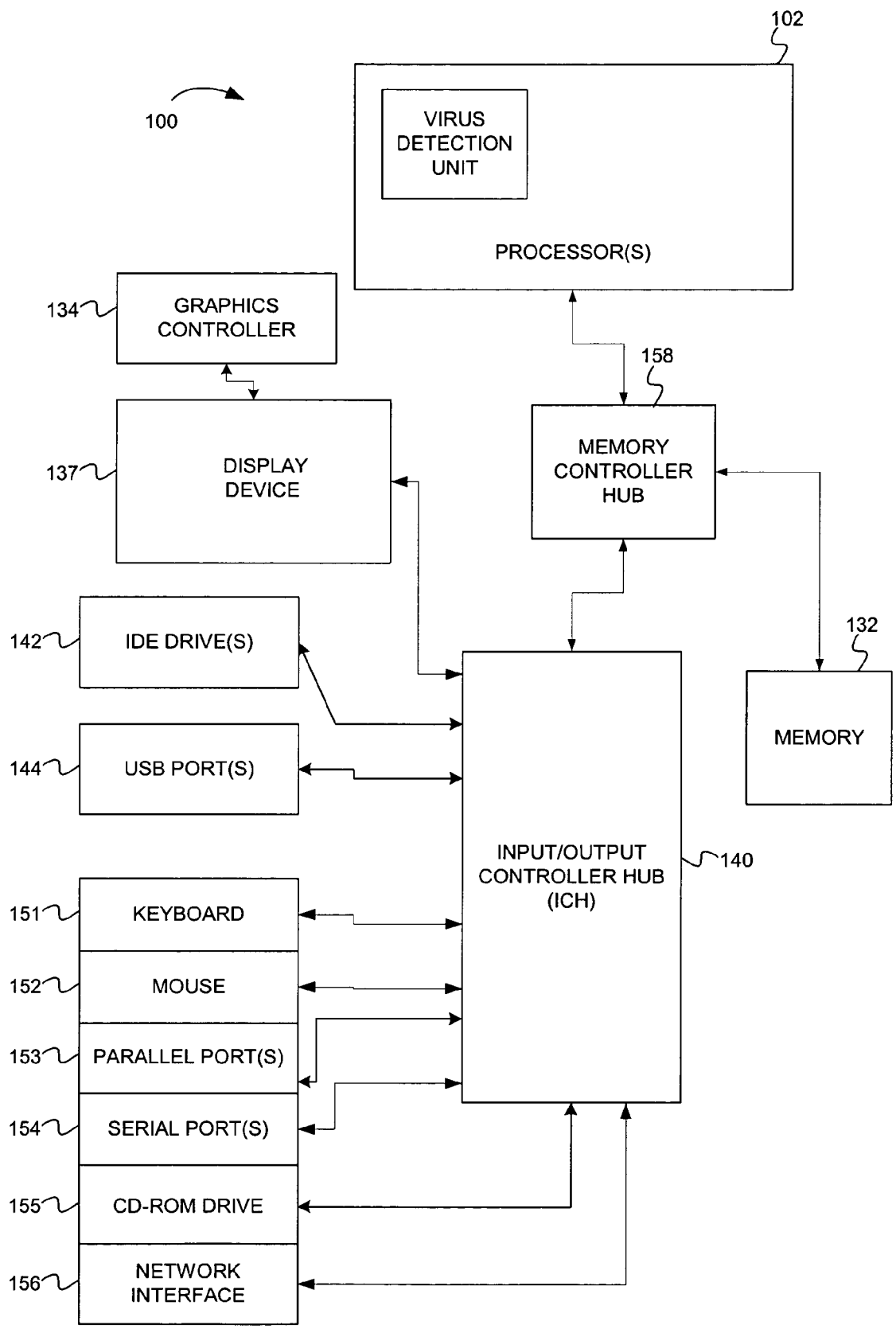
FIG. 1 illustrates an exemplary computer system used in conjunction with certain embodiments of the invention.

FIG. 1 illustrates an exemplary computer system used in conjunction with certain embodiments of the invention. As illustrated in FIG. 1, computer system 100 comprises processor(s) 102, which includes a virus detection unit. Computer system 100 also includes a memory 132, processor bus 110, memory controller hub 158, and input/output controller hub (ICH) 140. As shown in FIG. 1, the processor(s) 102, memory controller hub 158, and ICH 140 are connected together. The processor(s) 102 may comprise any suitable processor architecture. The computer system 100 may comprise one, two, three, or more processors, any of which may execute a set of instructions in accordance with embodiments of the present invention.

The memory controller hub 158 provides an interface to the memory 132, which stores data and/or instructions, and may comprise any suitable memory, such as a dynamic random access memory (DRAM), for example. The computer system 100 also includes IDE drive(s) 142 and/or other suitable storage devices. A graphics controller 134 controls the display of information on a display device 137, according to embodiments of the invention.

The input/output controller hub (ICH) 140 provides an interface to I/O devices or peripheral components for the computer system 100. The ICH 140 may comprise any suitable interface controller to provide for any suitable communication link to the memory controller hub 158 and/or to any suitable device or component in communication with the ICH 140. For one embodiment of the invention, the ICH 140 provides suitable arbitration and buffering for each interface.

For one embodiment of the invention, the ICH 140 provides an interface to one or more suitable integrated drive electronics (IDE) drives 142, such as a hard disk drive (HDD) or compact disc read only memory (CD ROM) drive, or to suitable universal serial bus (USB) devices through one or more USB ports 144. For one embodiment, the ICH 140 also provides an interface to a keyboard 151, a mouse 152, a CD-ROM drive 155, one or more suitable devices through one or more parallel ports 153 (e.g., a printer), and one or more suitable devices through one or more serial ports 154. For one embodiment of the invention, the ICH 140 also provides a network interface 156 though which the computer system 100 can communicate with other computers and/or devices.

In one embodiment, the computer system 100 includes a machine-readable medium that stores a set of instructions (e.g., software) embodying any one, or all, of the methodologies described herein. Furthermore, software can reside, completely or at least partially, within memory 132 and/or within the processor(s) 102.

System Level Overview

Figure 2:
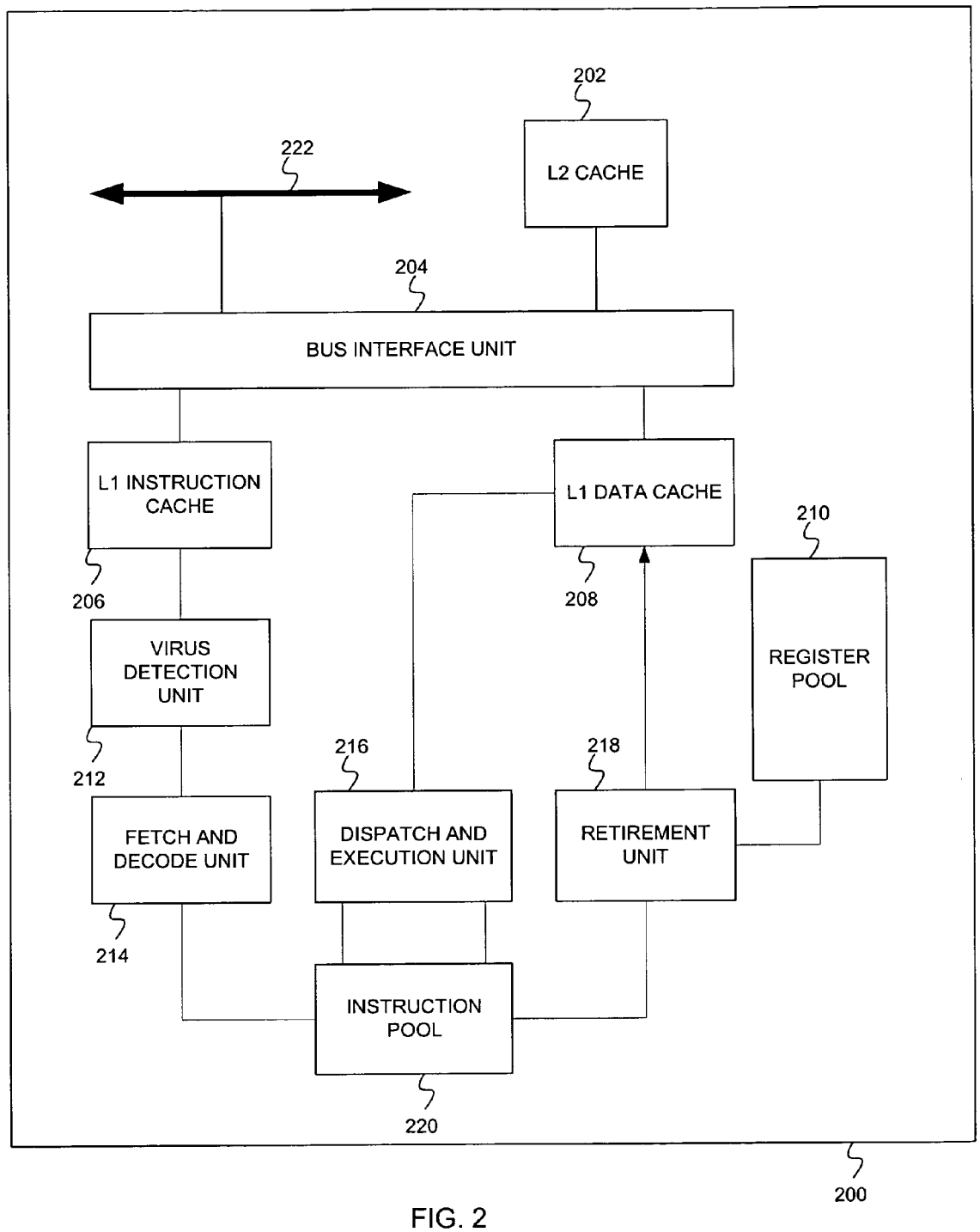
FIG. 2 is a block diagram illustrating an architecture for a processor-based virus detection system, according to embodiments of the invention.
Figure 3:
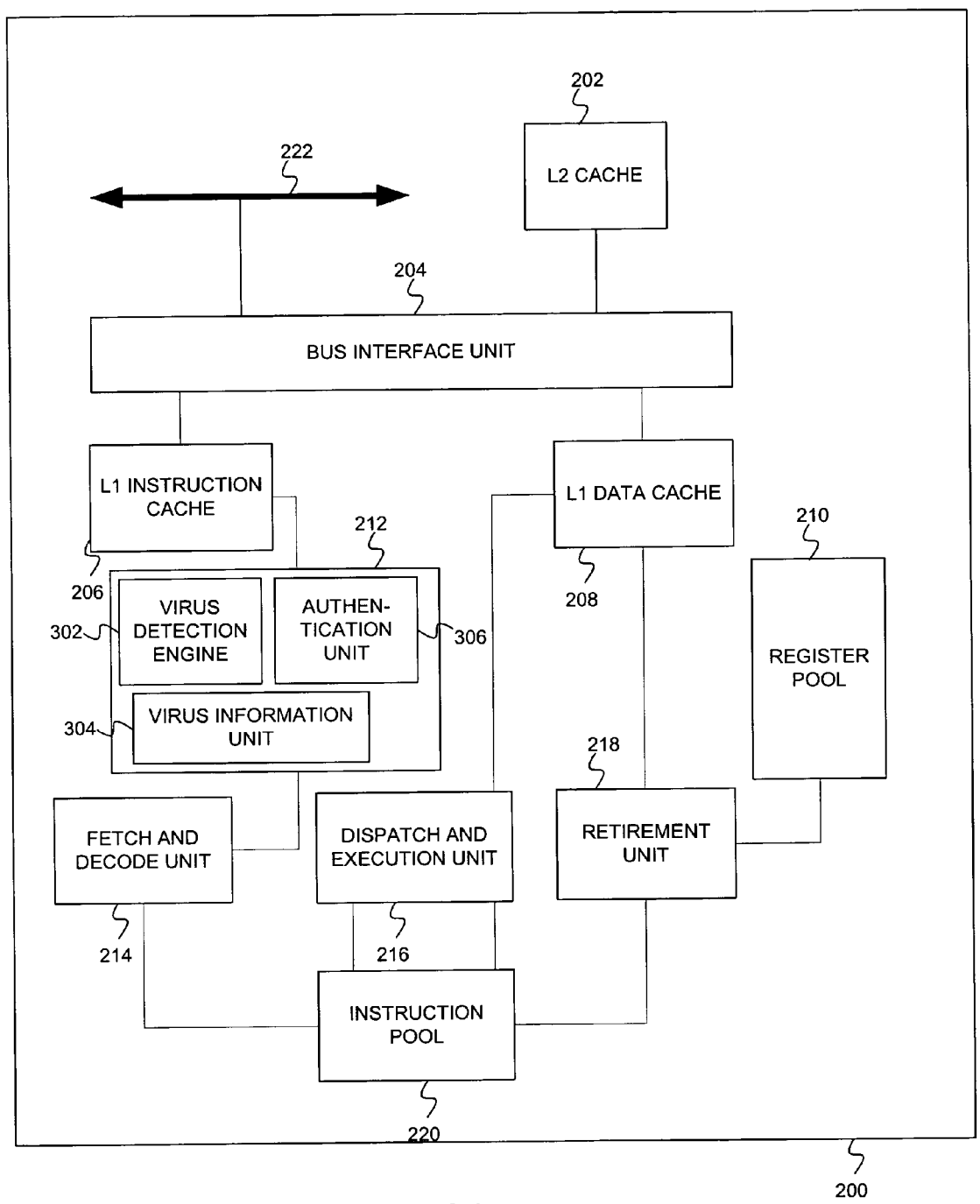
FIG. 3 is a block diagram illustrating an alternative architecture for the processor based virus detection system of FIG. 2, according to exemplary embodiments of the invention.
Figure 4:
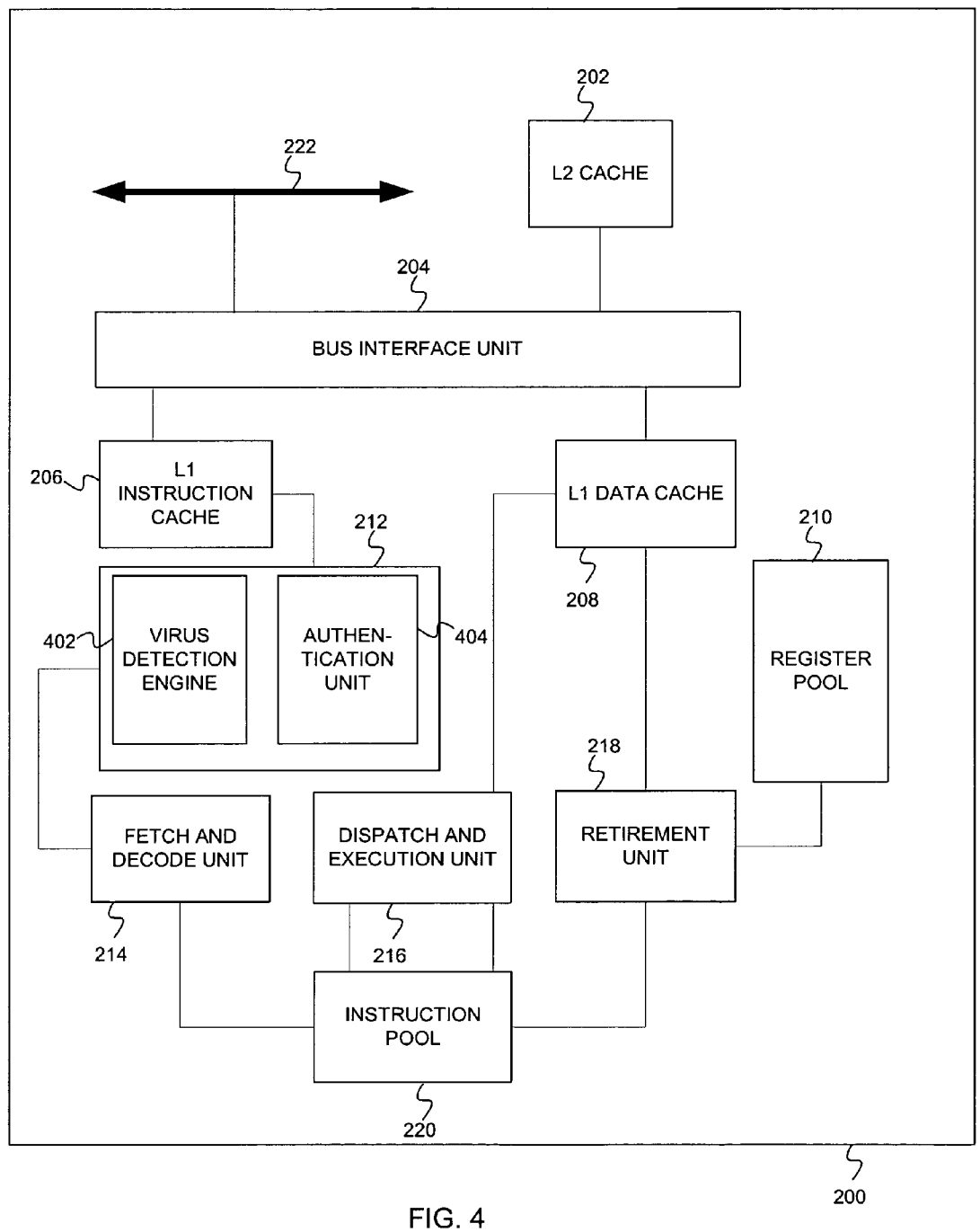
FIG. 4 is a block diagram illustrating an alternative architecture for the processor based virus detection system of FIG. 2, according to exemplary embodiments of the invention.

This section provides a system level overview of exemplary embodiments of the invention. FIGS. 2-4 show architectures for functional elements contained within a processor. Operations for the functional elements are described in the next section.

FIG. 2 is a block diagram illustrating an architecture for a processor-based virus detection system, according to embodiments of the invention. FIG. 2 shows a processor 200 and its functional elements. The processor 200 includes a bus interface unit 204 coupled to a level-2 cache 202 and a system bus 222. The bus interface unit 204 is also coupled to a level-one instruction cache 206 and a level-one data cache 208. The level-one instruction cache 206 is coupled to a virus detection unit 212, which is coupled to a fetch and decode unit 214. The fetch and decode unit 214 is coupled to an instruction pool 220, which is coupled to a dispatch and execution unit 216 and a retirement unit 218. The retirement unit 218 is coupled to the level-one data cache 208 and a register pool 210. The processor 200 can also include functional elements and connections not shown in FIG. 2. For example, the processor 200 can include additional arithmetic-logic units for performing various calculations, such as address calculations and other arithmetic operations. As another example, the processor 200 can include bus connectivity between the register pool 210 and the dispatch and execution unit 216.

FIG. 3 is a block diagram illustrating an alternative architecture for a processor based virus detection system, according to exemplary embodiments of the invention. FIG. 3 is similar to FIG. 2 except the virus detection unit 212 is shown in more detail. In the embodiment depicted in FIG. 3, the virus detection unit 212 includes three constituent units including a virus detection engine 302, and authentication unit 306, and a virus information unit 304. Although not shown, the constituent units (302, 306, and 304) of the virus detection unit 212 are capable of various connectivities. For example, the constituent units can be fully connected or connected through any other suitable connection architecture. Moreover the constituent units can communication according to any suitable communication method or protocol.

In one embodiment, the virus information unit 304 stores virus information including virus signatures and/or virus profiles including virus state information. The virus detection engine 302 uses the virus information to determine whether instructions are associated with a virus. The authentication unit 306 authenticates the source of virus information and virus processing interrupt handlers (e.g., software programs residing in the memory 132 that transmit virus information to the virus detection unit 212). These units and operations performed by these units will be described in greater detail below.

According to embodiments of the invention, the virus detection engine 302, authentication unit 306, and virus information unit 304 can be various integrated circuits, memories, and/or machine-readable media for performing operations according to embodiments of the invention. Machine-readable media includes any mechanism that provides (i.e., stores and/or transmits) information in a form readable by a machine (e.g., a computer). For example, a machine-readable medium includes read only memory (ROM), random access memory (RAM), magnetic disk storage media, optical storage media, flash memory devices, electrical, optical, acoustical or other forms of propagated signals (e.g., carrier waves, infrared signals, digital signals, etc.), etc. According to embodiments of the invention, the virus detection engine 302, authentication unit 306, and virus information unit 304 can be other types of logic (e.g., digital logic) for executing the operations described herein.

FIG. 4 is a block diagram illustrating an alternative architecture for the processor based virus detection system of FIG. 2, according to exemplary embodiments of the invention. FIG. 4 is similar to FIGS. 2 and 3 except that the virus detection unit 212 is shown including a virus detection engine 402 and an authentication unit 404. As shown in FIGS. 2-4, the virus detection unit 212 can include different constituent units, according to alternative embodiments of the invention. It should be understood that the constituent units of the virus detection unit 212 can be further subdivided or integrated, according to alternative embodiments of the invention. Moreover, it should be understood that the virus detection unit 212 can be coupled to different functional units of the processor 200. For example, the virus detection unit 212 can be coupled to the fetch and decode unit 214 and the instruction pool 220. Alternatively, the virus detection unit can be coupled to the instruction pool to the dispatch and execution unit 216.

Methods of the Invention

This section describes methods performed by embodiments of the invention. In certain embodiments, the methods are performed by machine-readable media (e.g., RAM), while in other embodiments, the methods are performed by hardware or other logic (e.g., digital logic). The discussion of FIGS. 2-4 above described architectures for the processor and its functional units, whereas the following discussion of FIG. 5 will describe the operations of the processor's functional units. In particular, FIG. 5 describes the data flow and interaction between the processor's functional units.

Figure 5:
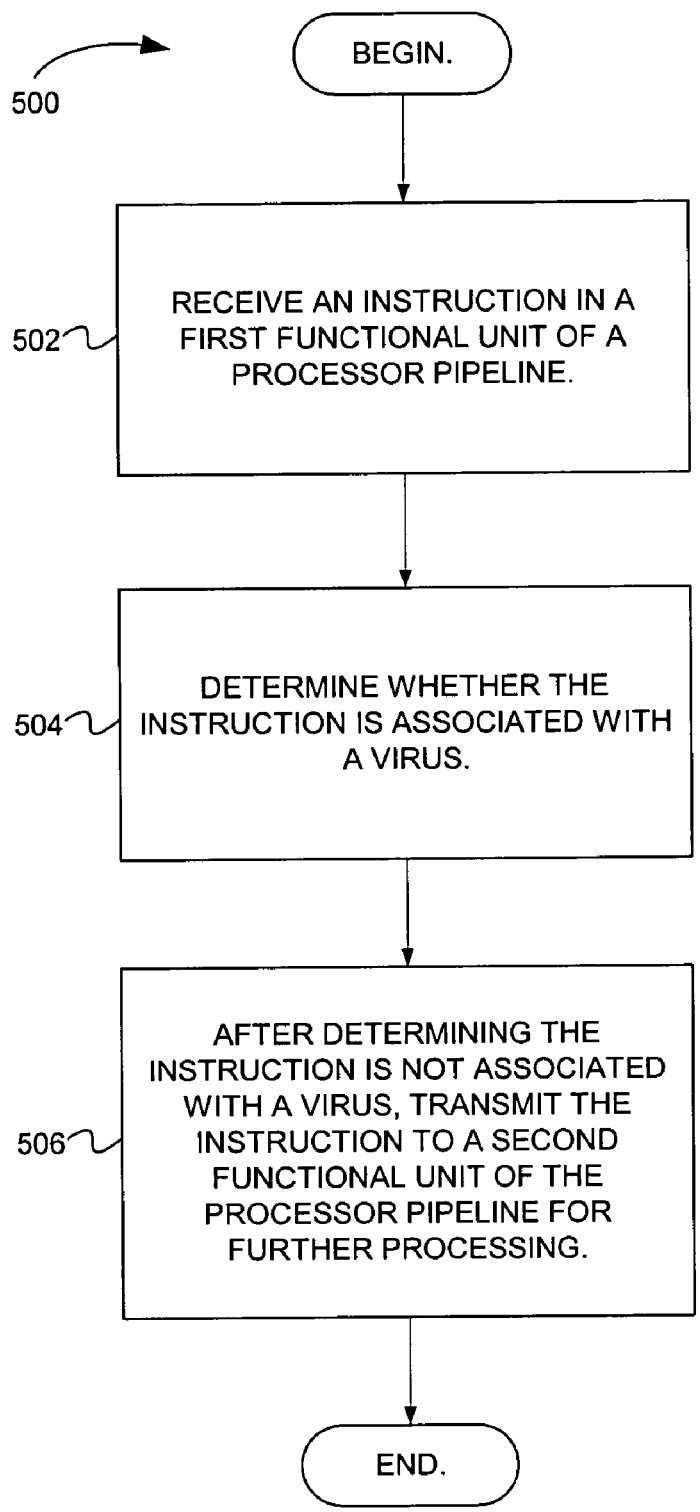
FIG. 5 is a flow diagram illustrating operations of a virus detection unit, according to exemplary embodiments of the invention.

FIG. 5 is a flow diagram illustrating operations of a virus detection unit, according to exemplary embodiments of the invention. The operations of the flow diagram 500 will be described with reference to the exemplary virus detection unit of FIG. 2. The flow diagram 500 commences at block 502, where an instruction is received in a first functional unit of a processor pipeline. For example, referring to FIG. 2, the virus detection unit 212 receives an instruction from the level-one instruction cache 206. According to alternative embodiments, the first functional units can be the fetch and decode unit 214 or instruction pool 220. In alternative embodiments, the virus detection unit 212 receives instructions from still other functional units. The process continues at block 504.

At block 504, it is determined whether the instruction is associated with a virus. For example, the virus detection unit 212 determines whether the instruction is associated with a virus. The process continues at block 506.

As shown in block 506, after determining the instruction is not associated with a virus, the instruction is transmitted to a second functional unit of the processor pipeline for further processing. For example, after determining the instruction is not associated with a virus, the virus detection unit 212 transmits the instruction to the fetch and decode unit 214 for further processing. According to alternative embodiments, the second functional unit could be the instruction pool 220 or the dispatch and execution unit 216. From block 506, the process ends.

Exemplary Implementation

Figure 6:
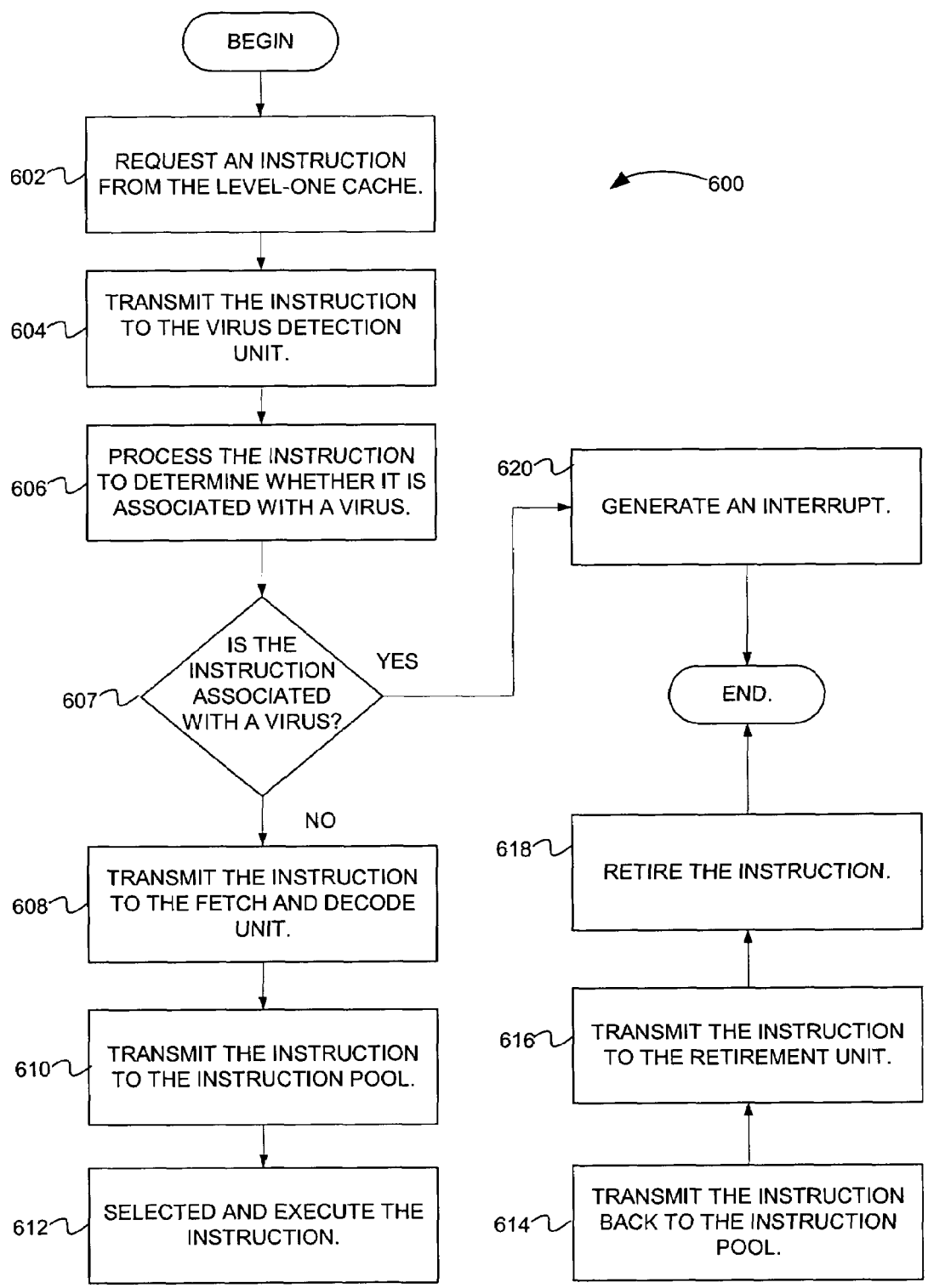
FIG. 6 is a flow diagram illustrating exemplary operations for fetching and executing an instruction, according to exemplary embodiments of the invention.

This section describes exemplary embodiments of the invention in greater detail. In the following discussion, FIGS. 6-16 will be described. FIG. 6 describes the general operations performed by the functional units of the processor 200 for fetching and executing an instruction, while FIG. 7 describes operations of the virus detection unit 212.

FIG. 6 is a flow diagram illustrating exemplary operations for fetching and executing an instruction, according to exemplary embodiments of the invention. FIG. 6 will be described with reference to the exemplary processor shown in FIG. 2. The flow diagram 600 commences at block 602, where an instruction is requested from the level-one cache. For example, referring to FIG. 2, the fetch and decode unit 214 requests an instruction from the level-one instruction cache 206. The process continues at block 604.

At block 604, an instruction is transmitted to the virus detection unit. For example, the level-one instruction cache transmits the requested instruction to the virus detection unit 212. The process continues at block 606.

As shown in block 606, the instruction is processed to determine whether it is associated with a virus. For example, the virus detection unit 212 determines whether the instruction is associated with a virus. Operations for determining whether an instruction is associated with a virus are described in greater detail below. The process continues at block 607.

At block 607, it is determined whether the instruction is associated with a virus. For example, the virus detection unit 212 determines whether the instruction is associated with a virus. If the instruction is associated with a virus, the process ends. Otherwise, the process continues at block 608.

At block 608, the instruction is transmitted to the fetch and decode unit. For example, the virus detection unit 212 transmits the instruction to the fetch and decode unit 214. From block 608, the process continues at block 610.

As shown in block 610, the instruction is transmitted to the instruction pool. For example, the fetch and decode unit 214 transmits the instruction to the instruction pool 220. The process continues at block 612.

At block 612, an instruction is selected and executed. For example, the dispatch and execution unit 216 selects and executes the instruction from the instruction pool 220. The process continues at block 614.

At block 614, the instruction is transmitted back to the instruction pool. For example, the dispatch and execution unit 216 transmits the executed instruction back to the instruction pool 220. The process continues at block 616.

As shown in block 616, the executed instruction is transmitted to the retirement unit. For example, the instruction pool 220 transmits the executed instruction to the retirement unit 218. The process continues at block 618.

At block 618, the executed instruction is retired. For example, the retirement unit 218 retires the executed instruction. In one embodiment, as part of instruction retirement, the retirement unit 218 updates registers in the register pool 210 and data in the level-one data cache 208.

While FIG. 6 illustrates the operations of the processor 200 as occurring sequentially for one instruction, it should be understood that the functional units of the processor 200 are capable of executing in parallel for multiple instructions. Therefore, the functional units of the processor 200 form a processor pipeline. For example, the fetch and decode unit 214 fetches an instruction, while the dispatch and execution unit 216 contemporaneously executes another instruction. Similarly, the virus detection unit 212 is capable of determining whether an instruction is associated with a virus at the same time the retirement unit 218 is retiring a different instruction. Moreover, in one embodiment, the processor 200 is capable of executing instructions out-of-order and reordering the instructions before retirement.

Figure 7:
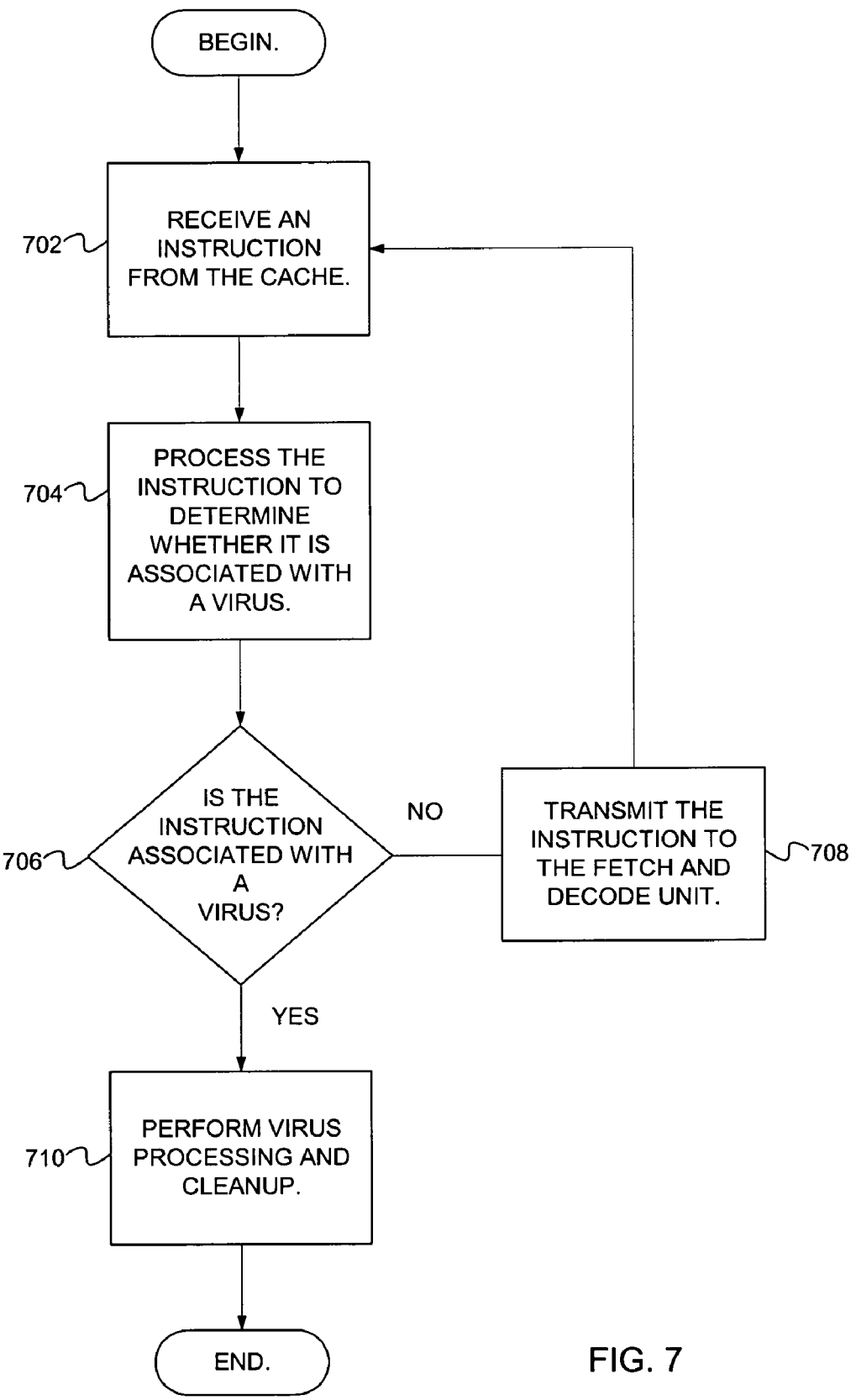
FIG. 7 is a flow diagram illustrating operations of a virus detection unit, according to exemplary embodiments of the invention.

While the discussion of FIG. 6 above described the operations of many of the processor's functional units, the following discussion of FIG. 7 will describe the general operations of the processor's virus detection unit. Certain of the operations set forth in FIG. 7 will also be described in more detail below, with reference to FIGS. 8-15.

FIG. 7 is a flow diagram illustrating operations of a virus detection unit, according to exemplary embodiments of the invention. The operations of the flow diagram 700 will be described with reference to the exemplary virus detection units of FIGS. 2-4. The flow diagram 700 commences at block 702, where an instruction is received from the cache. For example, referring to FIG. 2, the virus detection unit 212 receives an instruction from the level-one instruction cache 206. The process continues at block 704.

At block 704, the instruction is processed to determine whether it is associated with a virus. For example, the virus detection unit 212 determines whether the instruction is associated with a virus. In one embodiment, the virus detection engine 302 compares the instruction to virus signatures stored in the virus information unit 304. In an alternative embodiment, the virus detection engine 302 runs the instruction through a state machine, which uses state information stored in the virus information unit 304. The virus detection unit's operations for processing instructions are described in greater detail below (see FIGS. 8-11). The process continues at block 706.

As shown in block 706, it is determined whether the instruction is associated with a virus. For example, the virus detection unit 212 determines whether the instruction is associated with a virus based on results of the processing performed at block 704. If the instruction is associated with a virus the process continues at block 710. Otherwise, the process continues at block 708. At block 708, the instruction is transmitted to the fetch and decode unit. For example, the virus detection unit 212 transmits the instruction to the fetch and decode unit 214. From block 708, the process continues at block 702.

As shown in block 710, virus processing and removal is performed. For example, the virus detection unit 212 causes the processor 200 to flush the processor pipeline and drop the instruction associated with a virus. In one embodiment, the virus detection unit 212 generates an interrupt, calling an interrupt handler (interrupt handlers are described in more detail below) to remove the virus instructions from the processor pipeline and any associated memory systems (e.g., cache, main memory, and secondary storage devices). From block 710, the process ends.

FIGS. 8-11 illustrate concepts and operations for determining whether instructions are associated with a virus, as described above in block 704 of FIG. 7. In particular, FIGS. 8 and 9 describe signature matching, while FIGS. 10 and 11 describe operations of a state machine.

Figure 8:
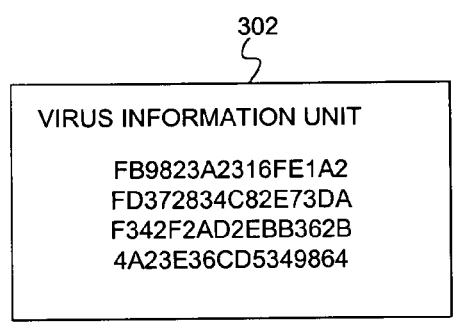
FIG. 8 is a more detailed block diagram of the virus information unit of FIG. 3, according to exemplary embodiments of the invention.

FIG. 8 is a block diagram illustrating a virus information unit, according to exemplary embodiments of the invention. As shown in FIG. 8, the virus information unit 304 includes virus signatures. Virus signatures are bit patterns that appear in known viruses. For example, the virus signatures shown in FIG. 8 represent hexadecimal byte strings of known viruses. In one embodiment, the virus information unit 304 includes a content addressable memory. Alternatively, the virus information unit 304 can be any other suitable fast memory. In one embodiment, the virus detection engine 302 compares instructions received from the level-one instruction cache 206 with the virus signatures stored in the virus information unit 302, as described below with reference to FIG. 9.

Figure 9:
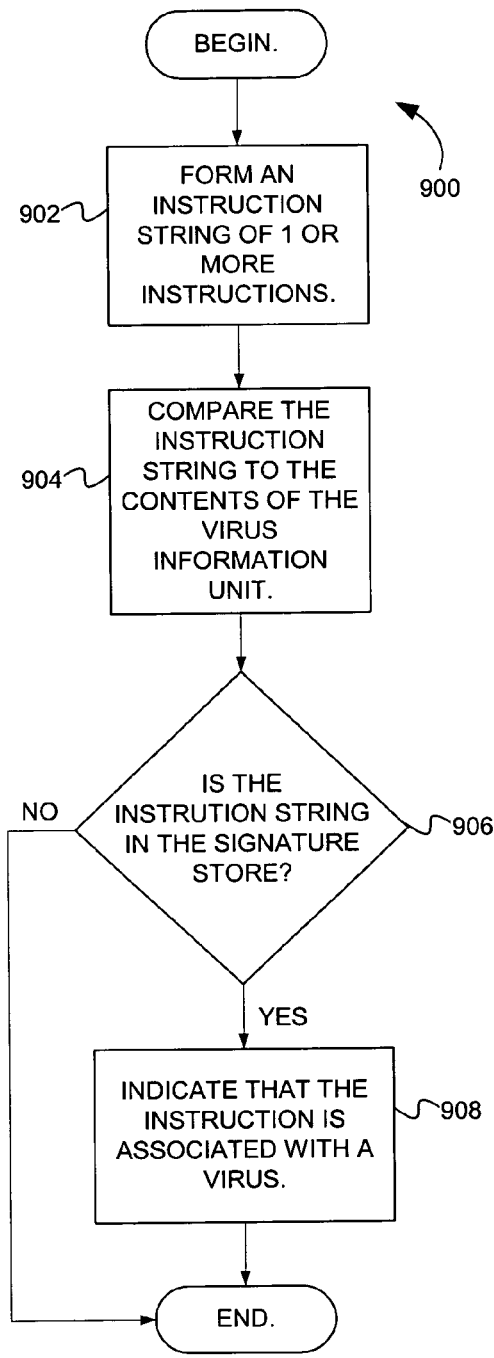
FIG. 9 is a more detailed description of operations for processing an instruction to determine whether the instruction is associated with a virus, as described in FIG. 7, according to exemplary embodiments of the invention.

FIG. 9 is a more detailed description of operations for processing an instruction to determine whether the instruction is associated with a virus, as described in FIG. 7, according to exemplary embodiments of the invention. The flow diagram 900 will be described with reference to the exemplary processor of FIGS. 2-4. The flow diagram 900 commences at block 902, where one or more instructions are combined to form an instruction string. For example, the virus detection engine 302 forms an instruction string including one or more instructions. The process continues at block 904.

At block 904, the instruction string is compared to the contents of the instruction information unit. For example, the virus detection engine 302 compares the instruction string to the contents of the virus information unit 304. The process continues at block 906.

At block 906, it is determined whether the instruction string matches virus signatures stored in the virus information unit. For example, the virus detection engine 302 determines whether the instruction string matched a virus signature of the virus information unit 304. If the instruction string matched a virus signature, the process continues at block 908. Otherwise, the process ends.

As shown in block 908, it is indicated that the instruction is associated with a virus. For example, the virus detection unit 212 indicates that the instruction is associated with a virus. In one embodiment, the virus detection unit 212 generates an interrupt indicating that the instruction is associated with a virus. In one embodiment, the associated interrupt handler flushes the processor pipeline and eliminates virus instructions from the processor and associated memory systems. From block 908, the process ends.

As noted above, FIGS. 10 and 11 describe concepts and operations for using a state machine to determine whether an instruction is associated with a virus. In particular, FIG. 10 shows a state machine, while FIG. 11 describes operations for moving between states of a state machine.

Figure 10:
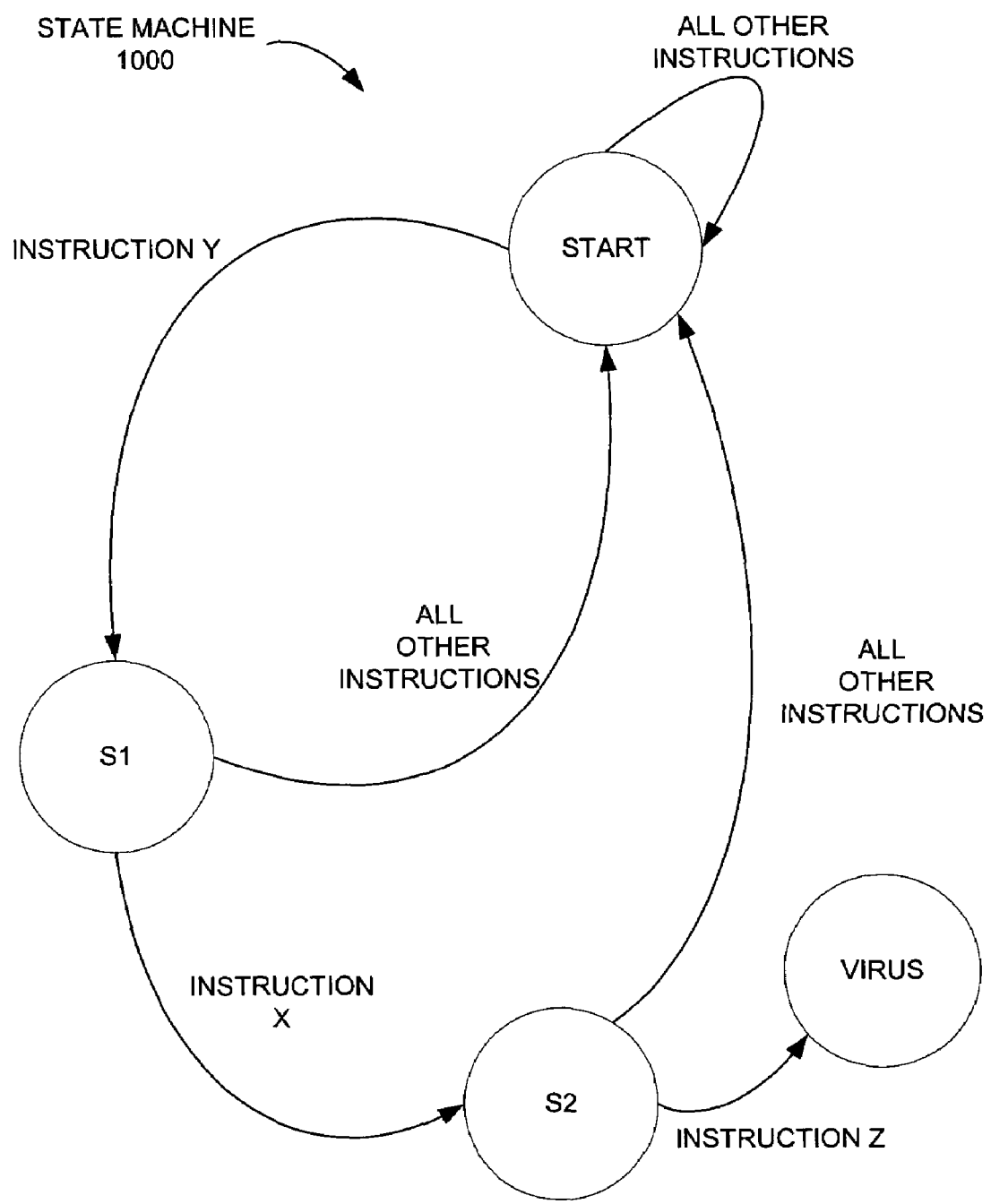
FIG. 10 is a block diagram of a state machine, according to exemplary embodiments of the invention.

FIG. 10 is a block diagram of a state machine, according to exemplary embodiments of the invention. As shown in FIG. 10, the state machine 1000 is a cyclic directed graph including four nodes, where each node is a state (e.g., START, S1, S2, and VIRUS represent states). The four states are START, S1, S2, and VIRUS. As shown in FIG. 10, the four states are connected by a series of the directed edges (i.e., arrows), each directed edge having an associated condition. For example, the conditions for the three directed edges leading into the START state are "all other instructions." The conditions for the directed edges leading out of the START state are "instruction y" and "all other instructions." In the state machine 1000, the "instruction y" condition represents a particular instruction. For example, "instruction y" could be an "XOR" instruction. Alternatively, "instruction y" could be an instruction with a specific pattern (e.g., XOR the contents of memory location 1000 with register EAX). The state machine 1000 begins at the START state and moves to other states when the various conditions are satisfied. Operations for moving through the states are described below in FIG. 11.

Figure 11:
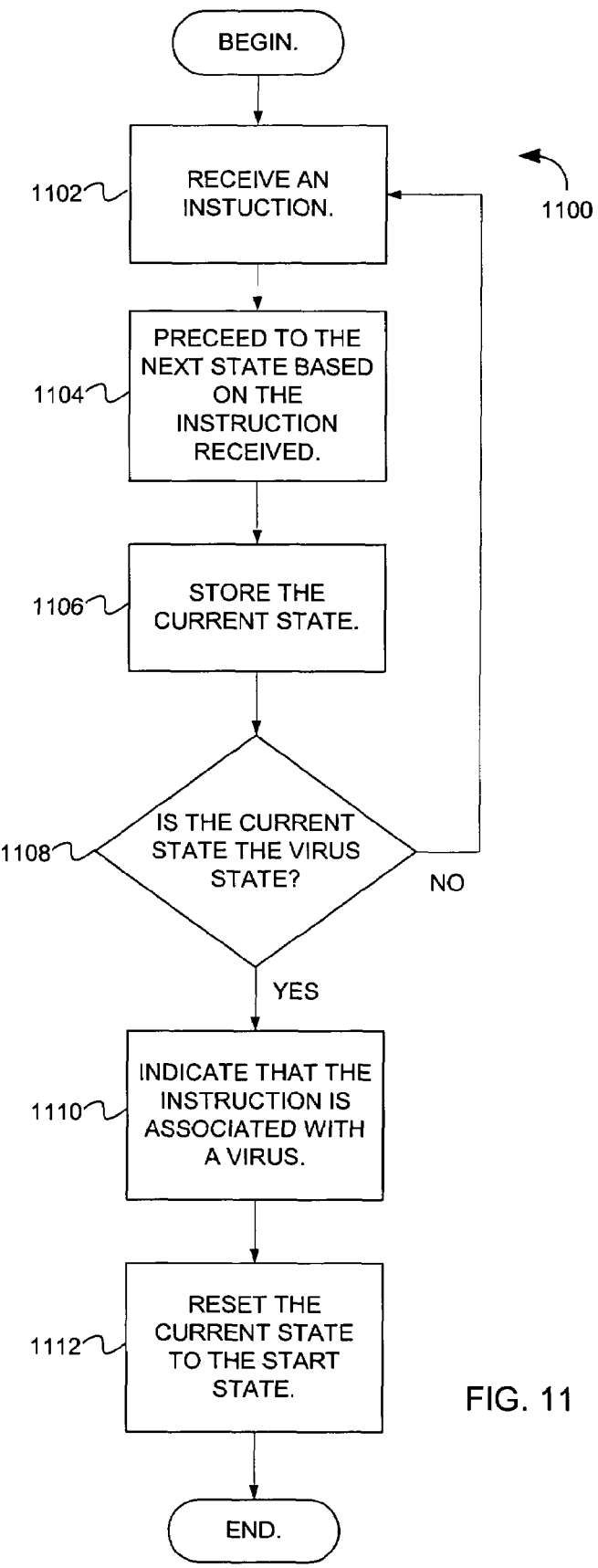
FIG. 11 is a flow diagram illustrating operations for using a state machine in determining whether an instruction is associated with a virus, according to exemplary embodiments of the invention.

FIG. 11 is a flow diagram illustrating operations for using a state machine in determining whether an instruction is associated with a virus, according to exemplary embodiments of the invention. The flow diagram 1100 will be described with reference to the exemplary state machine of FIG. 10 and the exemplary processor of FIGS. 2-4. The flow diagram 1100 commences at block 1102, where an instruction is received. For example, the virus detection engine 302 receives an instruction from the level-one instruction cache 206. The process continues at block 1104.

At block 1104, progress is made to another state based on whether an instruction meets one of the state's conditions. For example, referring to the state machine 1000 of FIG. 10, the state machine proceeds from START to S1 when the instruction received at block 1102 matches "instruction y." For all other instructions received at block 1102, the START state would cycle back to itself. As another example, the virus detection engine 302 proceeds from S1 to S2 when the received instruction matches "instruction x." The process continues at block 1106.

At block 1106, the current state is stored. For example, the virus detection engine 302 stores the current state in the virus information unit 304. The process continues at block 1108.

As shown in block 1108, it is determined whether the current state is the VIRUS state. For example, referring to state machine 1000, the virus detection engine 302 determines whether the current state is the VIRUS state. If the current state is the virus state, the process continues at block 1110. Otherwise, the process continues at block 1102.

At block 1110, an indication that the instruction is associated with a virus is made. For example, the virus that unit 212 generates an interrupt for handling the virus. The process continues at block 1112.

As shown in block 1112, the current state is reset to the START state. For example, the virus detection engine 302 resets the current state to be the START state. From block 1112, the process ends.

As mentioned above, an interrupt handler can be provided to process and remove viruses. FIGS. 12 and 13 describe operations for providing such an interrupt handler, according to embodiments of the invention. In particular, FIG. 12 describes operations for receiving an interrupt vector identifying an interrupt handler in a processor, while FIG. 13 describes operations for transmitting the interrupt vector identifying an interrupt handler to the processor from an external source. According to embodiments of the invention, the operations for receiving and transmitting a interrupt vector identifying a virus processing interrupt handler may be performed using instructions of the processor's instruction set, which are specifically for communicating with the virus detection unit 212. For example, the virus information source could use special secure processor instructions for authenticating itself with the authentication unit 306.

FIG. 12 is a flow diagram illustrating operations for receiving an interrupt vector identifying a virus processing interrupt handler, according to exemplary embodiments of the invention. The flow diagram 1200 will be described with reference to the exemplary processors of FIGS. 2-4. The flow diagram 1200 begins at block 1202, where a request to register an interrupt vector identifying a virus processing interrupt handler is received. For example, hardware and/or software units (e.g., operating system software not shown in FIGS. 2-4), which are part of or executing on the processor 200, receive a request to register interrupt vectors identifying a virus processing interrupt handler. The process continues at block 1204.

At block 1204, a request for authentication data is transmitted. For example, the authentication unit 306 transmits a request for authentication data to the source of the interrupt handler (e.g., a software process executing on the processor 200). The process continues at block 1206.

As shown in block 1206, authentication data is received and an attempt is made to authenticate the interrupt handler source. For example, the authentication unit 306 receives the authentication data from the interrupt handler source. The authentication unit 306 attempts to authenticate the interrupt handler source based on the authentication data. In one embodiment of the invention, the authentication unit 306 authenticates the interrupt handler source using a challenge-response authentication method. Alternative embodiments of the invention can use any suitable authentication method. The process continues at block 1208.

At block 1208, it is determined whether the authentication was successful. For example, the authentication unit 306 determines whether the interrupt handler source properly responded according to the implemented authentication technique (for example, challenge-response authentication). If the authentication was successful, control continues at block to 1210. Otherwise, the process ends.

At block 1210, the interrupt vector identifying the virus processing interrupt handler is received and installed. For example, hardware and/or software units (e.g., operating system software not shown in FIGS. 2-4), which are included in or executing on the processor 200, receive and install the virus processing interrupt handler to respond to interrupts generated by the virus detection unit 212. Additionally, the virus detection unit 212 receives an interrupt vector. In one embodiment, the interrupt vector corresponds to an interrupt descriptor table entry associated with the virus processing interrupt handler. In one embodiment, the virus detection unit 212 uses the interrupt vector to invoke the virus processing interrupt handler. For example, the virus detection unit 212 generates an interrupt that includes the interrupt vector. The interrupt causes the processor 200 to execute the virus processing interrupt handler because the virus processing interrupt is associated with the interrupt descriptor table entry indexed by the interrupt vector. In an alternative embodiment, the virus detection unit 212 receives different data for enabling the virus detection unit 212 to invoke the virus processing interrupt handler (e.g., a memory address). From block 1210, the process ends.

FIG. 13 is a flow diagram illustrating operations for transmitting interrupt vector identifying a virus processing interrupt handler, according to exemplary embodiments of the invention. The flow diagram 1300 will be described with reference to the exemplary processor of FIGS. 2-4. The flow diagram 1300 commences at block 1302, where a request to install a interrupt vector identifying a virus processing interrupt handler is transmitted. For example, a virus processing interrupt handler source (e.g., a hardware or software unit external to the processor 200 containing a virus processing interrupt) transmits a request to install a interrupt vector identifying a virus processing interrupt handler. The process continues at block 1304.

At block 1304, a request for authentication data is received. For example, the virus processing interrupt handler source receives a request for authentication data from the authentication unit 306. The process continues at block 1306.

As shown in block 1306, authentication data is transmitted. For example, the virus interrupt handler source transmits authentication data to the authentication unit 306. The process continues at block 1308.

At block 1308, it is determined whether the authentication was successful. For example, the virus processing interrupt source receives an indication from the authentication unit 306 about whether the authentication was successful. If the authentication was successful, the process continues at block 1310. Otherwise, the process ends.

At block 1310, the interrupt vector identifying a virus processing interrupt handler is transmitted. For example, the virus processing interrupt handler source transmits the interrupt vector identifying a virus processing interrupt handler to hardware and/or software units (e.g., operating system software not shown in FIGS. 2-4) included in or executing on the processor 200 designated for receiving and installing interrupt handlers. From block 1310, the process ends.

Figure 14:
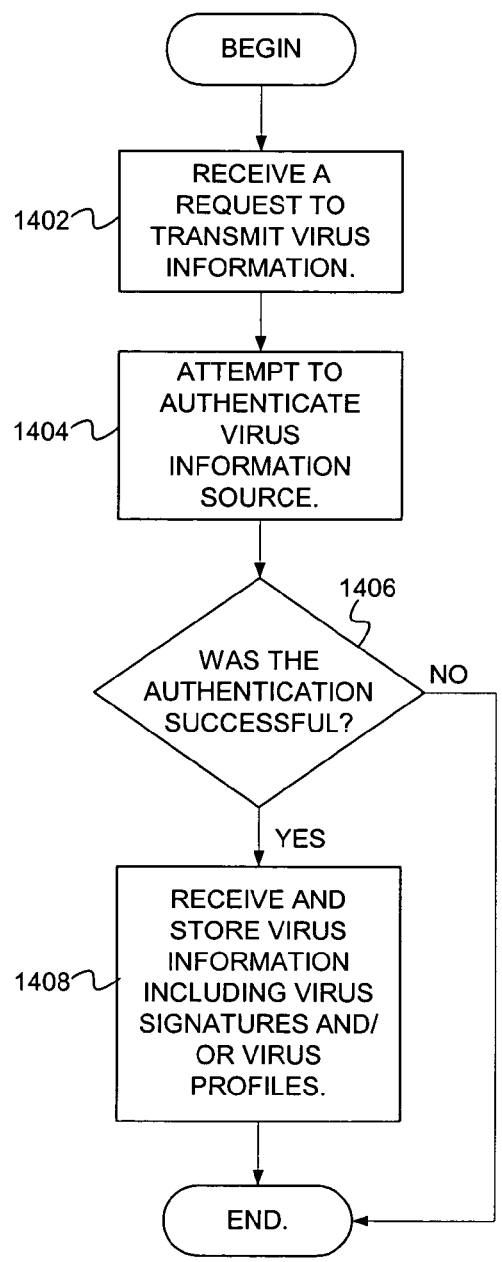
FIG. 14 is a flow diagram illustrating operations for transmitting virus information to a virus detection unit, according to exemplary embodiments of the invention.
Figure 15:
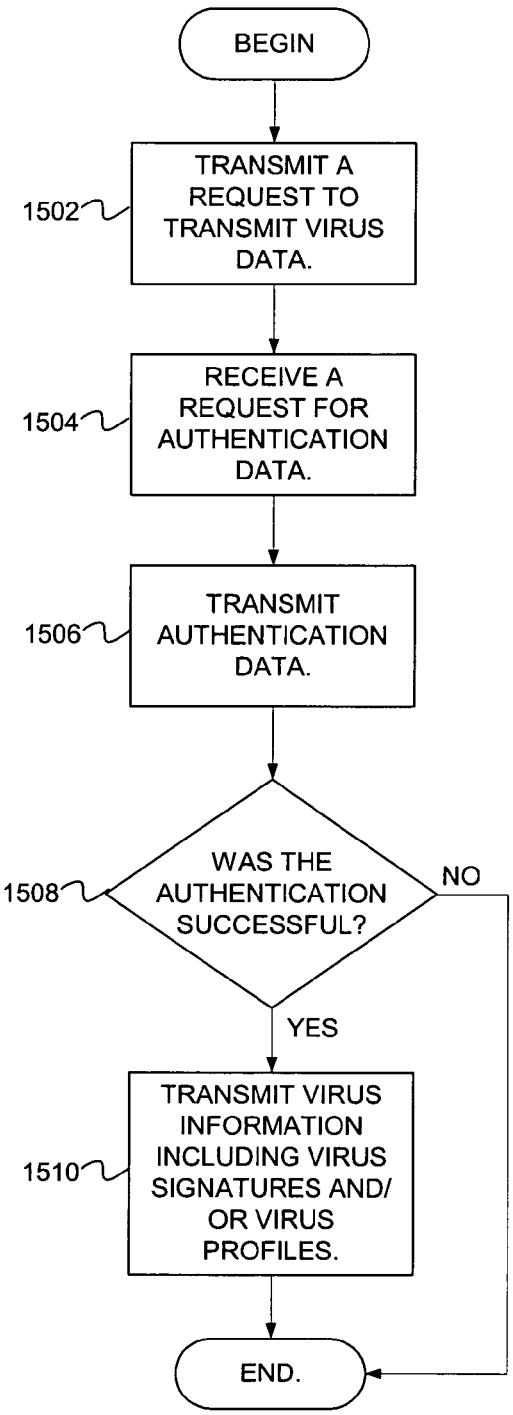
FIG. 15 is a flow diagram illustrating operations for transmitting virus information to a virus detection unit, according to exemplary embodiments of the invention.

FIGS. 14 and 15 describe operations for loading virus information including virus signatures and state information into a virus detection unit, according to embodiments of the invention. FIG. 14 describes operations performed by the virus detection unit, while FIG. 15 describes operations performed by a source of the virus detection information. According to embodiments of the invention, the operations for receiving and transmitting a virus information can be performed using instructions of the processor's instruction set, which are specifically for communicating with the virus detection unit 212. For example, the virus information source could use special secure processor instructions for authenticating itself with the authentication unit 306. Additionally, the virus information source could use special secure instructions for transmitting the virus information directly to the virus information unit 304.

FIG. 14 is a flow diagram illustrating operations for transmitting virus information to a virus detection unit, according to exemplary embodiments of the invention. The flow diagram 1400 will be described with reference to the exemplary processor of FIGS. 2-4. The flow diagram 1400 commences at block 1402, where a request to transmit virus information is received. For example, the virus information unit 304 receives a request to transmit virus information from a virus information source. In an alternative embodiment, the virus detection engine 302 receives such a request. The process continues at block 1404.

As shown in block 1404, an attempt is made to authenticate the virus information source. For example, the virus information unit 304 instructs the authentication unit 306 to attempt to authenticate the virus information source. In one embodiment, the virus information source is a set of one or more hardware or software units external to the processor 200 containing virus information. In one embodiment, the virus information source is software executing on the processor 200, while in alternative embodiments, it is software executing on a separate processor, which is communicatively coupled to the processor 200. The process continues at block 1406.

At block 1406, it is determined whether the authentication was successful. For example, the authentication unit 306 determines whether the virus information source provided the proper authentication information (see discussion above for additional details about authentication). If the authentication was successful, the process continues at block 1408. Otherwise the process ends.

At block 1408, virus information including virus signatures and/or virus profiles is received and stored. For example, the virus information unit 304 receives virus information from a virus information source. In one embodiment of virus information includes virus signatures and/or virus profiles. In one embodiment, virus profiles include state information used by the virus detection engine 302 in determining whether instructions are associated with a virus (see discussion above). From block 1408, the process ends.

FIG. 15 is a flow diagram illustrating operations for transmitting virus information to a virus detection unit, according to exemplary embodiments of the invention. The flow diagram 1500 will be described with reference to the exemplary processors of FIGS. 2-4. The flow diagram 1500 commences at block 1502, where a request to transmit virus information is transmitted. For example, a virus information source transmits a request to transmit virus information to the virus detection unit 212. In one embodiment, virus information unit 304 receives this request. In alternative embodiment the virus detection engine 302 receives this request. The process continues at block 1504.

At block 1504, the request for authentication data is received. For example, the virus information source receives a request for authentication data from the authentication unit 306. In one embodiment, the request includes a challenge in accordance with a challenge-response authentication protocol. The process continues at block 1306.

As shown in block 1506, authentication data is transmitted. For example, the virus information source transmits authentication data to the authentication unit 306. In one embodiment, the virus information source transmits a response in accordance with a challenge-response authentication protocol. The process continues at block 1508.

At block 1508, it is determined whether the authentication was successful. If the authentication was successful, the process continues at block 1510. Otherwise, the process ends.

As shown in block 1510, virus information including virus signatures and/or virus profiles is transmitted. For example, the virus information source transmits the virus information to the virus information unit 304. In alternative embodiment, the virus information source transmits the virus information to the virus detection engine 302. From block 1510, the process ends.

The virus detection system described above can be used to detect many types of viruses. In particular, the virus system can be used to detect polymorphic viruses. The following discussion of FIG. 16 will describe the general behavior of polymorphic viruses.

Figure 16:
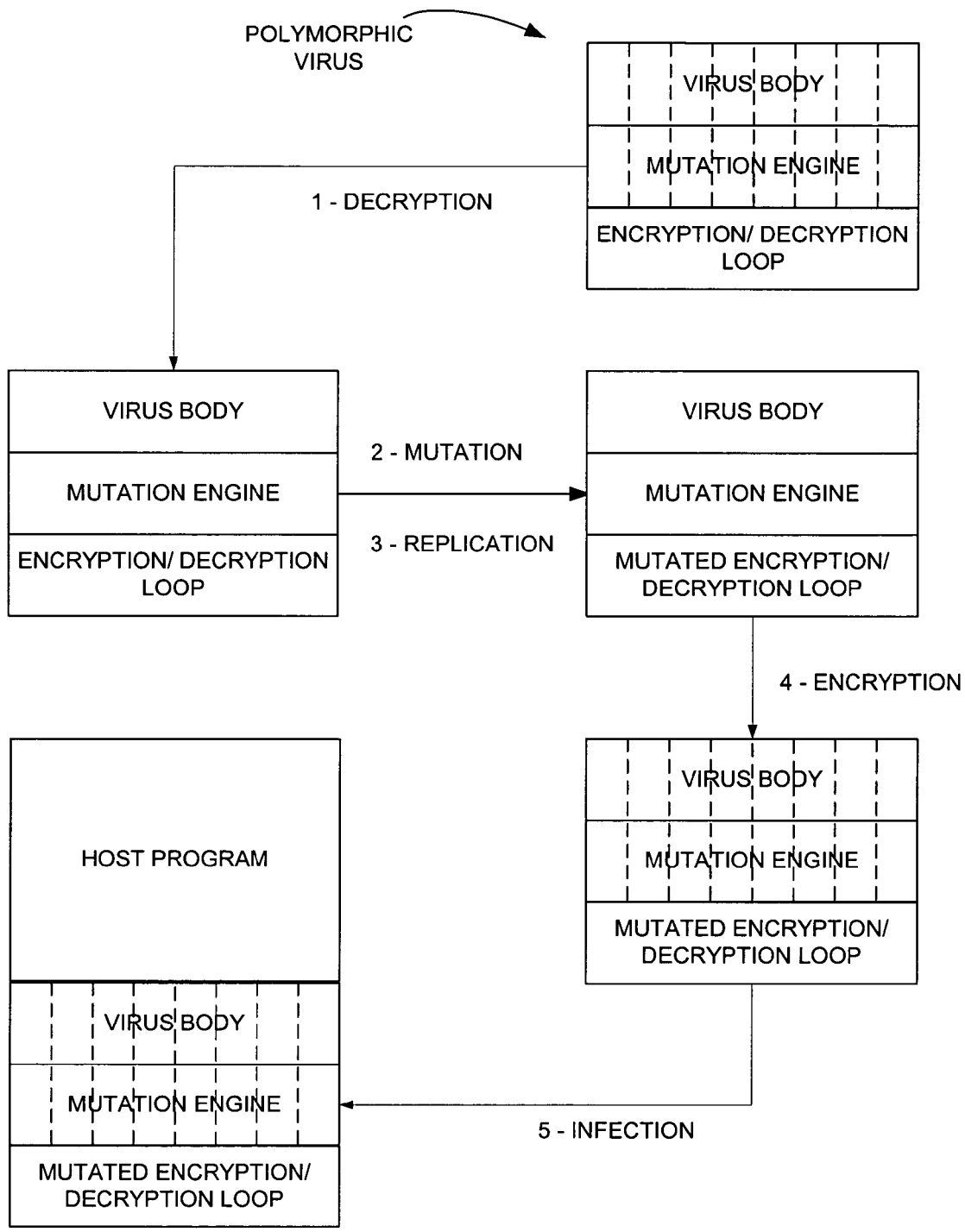
FIG. 16 is a data flow diagram illustrating the general behavior of a polymorphic virus.

FIG. 16 is a data flow diagram illustrating the general behavior of a polymorphic virus. In particular, the data flow diagram describes the behavior of a prolymorphic in five stages. Initially, the polymorphic virus includes a virus body, mutation engine, and encryption/decryption loop. The virus body and mutation engine are initially encrypted, as indicated by the hash marks. During stage 1, the encryption-decryption loop decrypts the virus body and mutation engine, resulting in an entirely decrypted polymorphic virus (indicated by the removal of the hash marks).

During stage 2, the mutation engine "mutates" the encryption/decryption loop. That is, the mutation engine changes the encryption/decryption algorithm and code. During stage 3, the virus replicates the virus body and mutation engine (i.e., the virus creates new copies of the virus body and mutation). During stage 4, the mutated encryption-decryption loop encrypts the virus body and mutation engine. During stage 5, the virus attaches the newly created virus body (now encrypted), mutation engine (now encrypted), and mutated encryption/decryption loop to a host program. After stage 5, the host program is "infected" because it contains a copy of the virus. After the host program is executed by a processor, the virus can further replicate itself, as described above.

We claim:

1. A processor comprising:
   a plurality of hardware functional units within the processor, the hardware functional units including a first hardware functional unit and a second hardware functional unit, the first hardware functional unit to receive instructions, to determine whether ones of the instructions are associated with a virus, and to transmit the ones of the instructions not associated with the virus to the second hardware functional unit; and
   wherein the first hardware functional unit is a hardware functional unit dedicated to functions associated to virus detection.

2. The processor of claim 1, wherein the first hardware functional unit is a virus detection unit, and wherein the second hardware functional unit is a fetch and decode unit.

3. The processor of claim 1, wherein the first hardware functional unit includes,
   a virus information unit to store virus information; and
   a virus detection engine to compare each of the instructions to the virus information.

4. The processor of claim 3, wherein the virus detection engine includes an authentication unit to authenticate a source of the virus information.

5. The processor of claim 1, wherein the first hardware functional unit includes a virus information unit, the virus information unit to store a state machine that is to determine whether ones of the instructions are associated with a virus.

6. The processor of claim 1, wherein the first hardware functional unit is a virus detection unit and wherein the second hardware functional unit is a dispatch and execution unit.

7. A apparatus comprising:
   an instruction cache to store instructions;
   a hardware virus detection unit within a processor to receive the instructions from the instruction cache, the hardware virus detection unit to determine whether ones of the instructions are associated with a virus; and
   a dispatch and execution unit within the processor to receive from the hardware virus detection unit the ones of the instructions that are not associated with the virus.

8. The apparatus of claim 7, wherein the hardware virus detection unit includes a virus information unit to store virus signatures, the virus detection unit to compare each of the instructions to the virus signatures.

9. The apparatus of claim 8, wherein the hardware virus detection unit includes an authentication unit to authenticate a source of the virus signatures.

10. The apparatus of claim 7, wherein the hardware virus detection unit includes a virus information unit to store state information, the hardware virus detection unit to input each of the instructions into a state machine.

11. A method comprising:
    receiving an instruction in a first functional unit of a processor pipeline, wherein the first functional unit is an integrated circuit within the processor pipeline dedicated to on-chip virus detection;
    determining within the first functional unit whether the instruction is associated with a virus; and
    after determining the instruction is not associated with a virus, transmitting the instruction to a second functional unit of the processor pipeline for further processing.

12. The method of claim 11, wherein the determining whether the instruction is associated with a virus includes, comparing the instruction to virus signatures stored in the first functional unit.

13. The method of claim 11, wherein the determining whether the instruction is associated with a virus includes inputting the instruction into a state machine stored in the first functional unit.

14. The method of claim 11 wherein the virus is a polymorphic virus.

15. The method 11, wherein the first functional unit is a virus detection unit, and wherein the second functional unit is a fetch and decode unit.

16. The method of claim 11, further comprising:
    after determining the instruction is associated with a virus, removing the instruction from the processor pipeline.

17. The method of claim 11, wherein the instruction has been partially processed by a set of one or more functional units of the processor pipeline.

18. A processor comprising:
    an instruction cache to store instructions;
    a virus detection circuit to receive the instructions from the instruction cache, the virus detection circuit to transmit ones of the instructions that are not associated with a virus, the virus detection circuit including,
      a virus information unit to store virus signatures and state machine information;
      an authentication unit to authenticate the source of the virus signatures and the state machine information; and
      a virus detection engine to compare certain of the instructions to the virus signatures, and to input certain of the instructions into a state machine configured according to the state machine information;
    a fetch and decode unit to receive ones of the instructions from the virus detection circuit; and a set of one or more execution units to receive ones of the instructions from the fetch and decode unit and to execute the ones of the instructions.

19. The processor of claim 18, wherein the virus detection engine determines whether ones of the instructions are associated with the virus.

20. A system comprising:
a synchronous dynamic random access memory (SDRAM) unit;
a processor coupled to the SDRAM unit, the processor including,
a plurality of functional units including a first functional unit and a second functional unit, the first functional unit to receive instructions, to determine whether ones of the instructions are associated with a virus, and to transmit the ones of the instructions not associated with the virus to the second functional unit; and
wherein the first functional unit is a circuit within the processor dedicated to virus detection.

21. The system of claim 20, wherein the first functional unit is a virus detection unit, and wherein the second functional unit is a fetch and decode unit.

22. The system of claim 20, wherein the first functional unit is a virus detection unit and wherein the second functional unit is a dispatch and execution unit.

23. The system of claim 20, wherein the first functional unit includes,
a virus information unit to store virus information; and
a virus detection engine to compare each of the instructions to the virus information stored in the processor.

24. The system of claim 20, wherein the virus detection unit includes an authentication unit to authenticate a source of the virus information.

25. The system of claim 20, wherein the first functional unit includes a virus information unit, the virus information unit to store a state machine for determining whether ones of the instructions are associated with a virus.

* * * * *

UNITED STATES PATENT AND TRADEMARK OFFICE
CERTIFICATE OF CORRECTION

PATENT NO. : 7,367,057 B2
APPLICATION NO. : 10/612763
DATED : April 29, 2008
INVENTOR(S) : Das et al.

It is certified that error appears in the above-identified patent and that said Letters Patent is hereby corrected as shown below:

On the title page, in field (56), under "Other Publications", in column 2, line 10, delete "Sympsium" and insert -- Symposium --, therefor.

In column 14, line 41, in Claim 15, after "method" insert -- of claim --.

Signed and Sealed this

Fifth Day of August, 2008

JON W. DUDAS
*Director of the United States Patent and Trademark Office*